US007904038B2

(12) United States Patent  
Satomi

(10) Patent No.: US 7,904,038 B2  
(45) Date of Patent: Mar. 8, 2011

(54) OUTPUT MONITOR CIRCUIT OF RADIO-FREQUENCY CIRCUIT

(75) Inventor: Akihiro Satomi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 552 days.

(21) Appl. No.: 11/612,098

(22) Filed: Dec. 18, 2006

(65) Prior Publication Data

US 2007/0139260 A1  Jun. 21, 2007

(30) Foreign Application Priority Data

Dec. 19, 2005  (JP) ................................ 2005-365095

(51) Int. Cl.  
*H04B 1/04* (2006.01)
(52) U.S. Cl. ..................... 455/127.1; 455/126; 455/127.3
(58) Field of Classification Search .................. 455/126, 455/127.1–127.5; 333/109, 116  
See application file for complete search history.

(56) References Cited

U.S. PATENT DOCUMENTS

| 4,211,911 | A  | * | 7/1980  | Dehn            | 333/109 |
| 5,424,694 | A  | * | 6/1995  | Maloratsky et al. | 333/112 |
| 6,483,398 | B2 | * | 11/2002 | Nagamori et al. | 333/116 |
| 6,556,815 | B1 | * | 4/2003  | Shibamura       | 455/126 |
| 6,972,640 | B2 | * | 12/2005 | Nagamori et al. | 333/109 |
| 2001/0043130 | A1 | * | 11/2001 | Nagamori et al. | 455/78  |
| 2002/0113666 | A1 | * | 8/2002  | Yamazaki et al. | 333/109 |
| 2002/0185659 | A1 |   | 12/2002 | Yamaguchi et al. |        |
| 2005/0059362 | A1 | * | 3/2005  | Kalajo et al.   | 455/127.1 |
| 2005/0156695 | A1 | * | 7/2005  | Andricacos et al. | 455/127.1 |
| 2005/0258917 | A1 | * | 11/2005 | Hubert          | 333/116 |
| 2006/0030277 | A1 | * | 2/2006  | Cyr et al.      | 455/126 |
| 2008/0204162 | A1 | * | 8/2008  | Kubo            | 333/116 |
| 2010/0171564 | A1 | * | 7/2010  | Yamamoto et al. | 333/116 |

FOREIGN PATENT DOCUMENTS

| EP | 1 294 044 A2 | 3/2003  |
| JP | 8-78901       | 3/1996  |
| JP | 11-308017     | 11/1999 |
| JP | 2002-43957    | 2/2002  |
| JP | 2004-343419   | 12/2004 |

OTHER PUBLICATIONS

Takashi Yoshida, "Radar Engineering Revised Edition", p. 166, edited by the Institute of Electronics, Information and Communication Engineers and published by Korona Publishing Company in Japan, Oct. 1, 1996.

Chin-Chang Chang, et al. "Enhanced Forward Coupling Phenomena Between Microstrip Lines On Periodically Patterned Ground Plane", IEEE MTT-S International Microwave Symposium Digest (IMS 2001), XP001061192, May 2001, pp. 2039-2042.

* cited by examiner

*Primary Examiner* — Lana N Le  
(74) *Attorney, Agent, or Firm* — Oblon, Spivak, McClelland, Maier & Neustadt, L.L.P.

(57) ABSTRACT

An output monitor circuit of a radio-frequency circuit outputs a radio-frequency signal of wavelength $\lambda$. The circuit includes a directional coupler, a detection circuit, and a back flow blocking circuit. The directional coupler has a coupling line of a length less than $\lambda/4$ coupled with an output line of the radio-frequency circuit and a terminating resistor connected to one end on the radio-frequency circuit side of the coupling line. A radio-frequency signal is derived from the other end of the coupling line by means of coupling between the coupling line and the output line. The detection circuit detects a radio-frequency signal derived from the directional coupler to produce a monitor signal. The back flow blocking circuit blocks signal components back flowing from the output side toward the output line in a portion where there is no coupling between the output line and the coupling line.

3 Claims, 1 Drawing Sheet

OUTPUT MONITOR CIRCUIT OF RADIO-FREQUENCY CIRCUIT

CROSS-REFERENCE TO RELATED APPLICATIONS

This application is based upon and claims the benefit of priority from prior Japanese Patent Application No. 2005-365095, filed Dec. 19, 2005, the entire contents of which are incorporated herein by reference.

BACKGROUND OF THE INVENTION

1. Field of the Invention

The present invention relates to a circuit which monitors the RF output state of a radio-frequency circuit adapted for, for example, a microwave circuit.

2. Description of the Related Art

A conventional microwave circuit used in radar equipment has a monitor circuit set on the same circuit board as an radio-frequency (RF) amplifier for the purpose of monitoring the RF output state and fault detection of that RF amplifier (see, for example, "Rader Engineering Revised Edition", page 166, edited by the Institute of Electronics, Information and Communication Engineers and published by Korona Publishing Company in Japan). The monitor circuit is configured to take a portion of the RF power from the RF output line of the amplifier using a directional coupler and obtain a DC voltage via an RF diode detector circuit. The DC voltage is monitored to detect variations in RF output power and faults of the amplifier.

The directional coupler is placed immediately after the output of the amplifier with space efficiency of the circuit board in mind. The length of the line which is coupled with the RF output line is normally selected to be $\lambda/4$ where $\lambda$ is the wavelength of the transmit signal). Since the RF output end of the directional coupler is located on the amplifier side, in order to connect the output end to the input of the RF detector circuit, it is required to fold back the wiring pattern. This results in an increase in the size of the circuit board.

BRIEF SUMMARY OF THE INVENTION

According to one aspect of the present invention, there is provided an output monitor circuit of a radio-frequency circuit which outputs a radio-frequency signal of wavelength $\lambda$ comprising: a directional coupler having a coupling line of a length less than $\lambda/4$ coupled with an output line of the radio-frequency circuit and a terminating resistor connected to one end on the radio-frequency circuit side of the coupling line, a radio-frequency signal being derived from the other end of the coupling line by means of coupling between the coupling line and the output line; a detection circuit which detects a radio-frequency signal derived from the directional coupler to produce a monitor signal; and a back flow blocking circuit which blocks signal components back flowing from the output side toward the output line in a portion where there is no coupling between the output line and the coupling line.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of an output monitor circuit of a microwave amplifier according to the present invention will be described hereinafter with reference to FIGS. 1 and 2.

Figure 1:
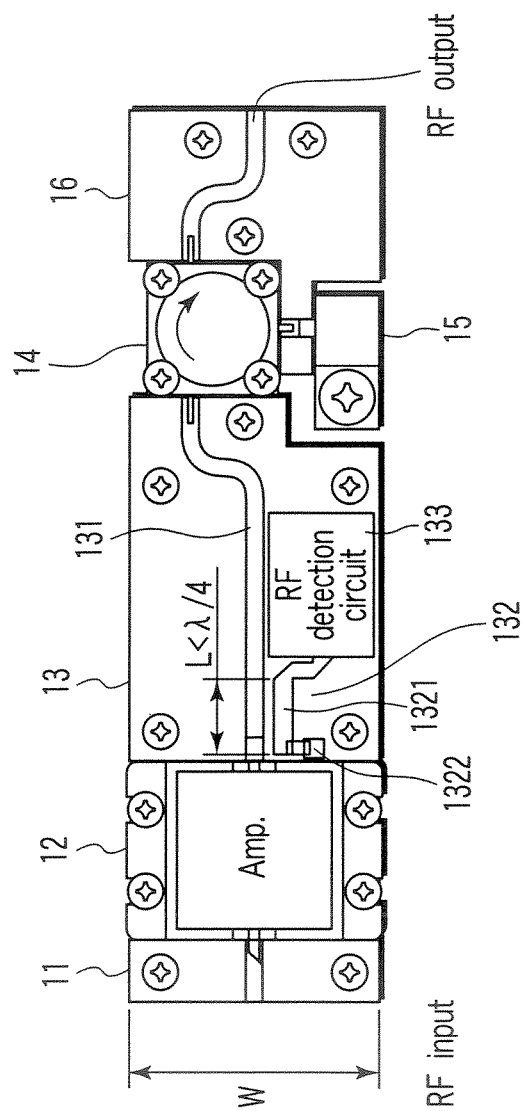
FIG. 1 shows the layout of a microwave amplifier and an output monitor circuit as an embodiment of the output monitor circuit in a radio frequency circuit according to the present invention.
Figure 2:
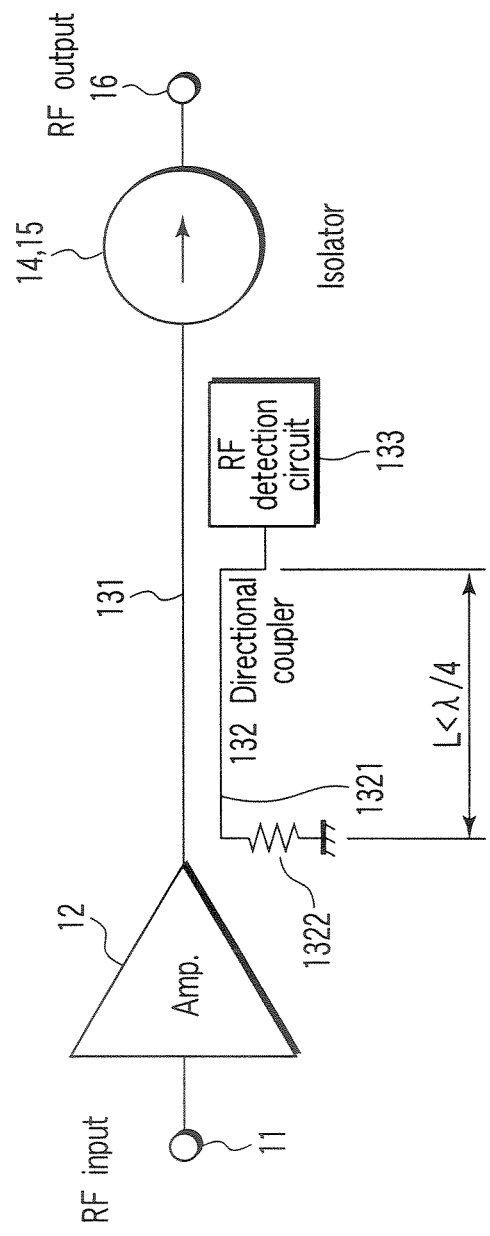
FIG. 2 shows the equivalent circuit of the radio-frequency circuit shown in FIG. 1.

FIG. 1 shows the layout of circuits and FIG. 2 shows the equivalent circuit of the circuits. In FIG. 1, 11 denotes an RF input terminal unit, 12 an amplifier unit in which the microwave amplifier is built, 13 an RF output monitor unit, 14 a circulator unit, 15 a terminating resistor unit, and 16 an RF output terminal unit. They are arranged on a base plate (not shown) and fixed to it with screws.

The output end of the amplifier unit 12 is coupled to an output line 131 formed in the monitor unit 13. In the monitor unit 13, a coupling line 1321 of a directional coupler 132 is formed in close proximity to the output line 131 and has its one end on the RF input side connected to a terminating resistor 1322 and its other end on the RF output side directly connected to the input of an RF detection circuit 133. The length L of the coupling line 1321 is selected to be less than a quarter of the RF signal wavelength $\lambda$. In view of the degree of coupling, the practical length of the coupling line is of the order of $\lambda/8$.

The output line 131 of the monitor unit 13 is connected to the signal input terminal of the circulator unit 14, which has its one signal output end connected to the output line of the RF output terminal unit 16. In addition, the circulator unit has its other output terminal connected to the terminating resistor unit 15. That is, the circulator unit 14 functions as an isolator as indicated by the equivalent circuit of FIG. 2. For this reason, unwanted signal components reflected from the RF output terminal unit 16 toward the circulator unit 14 are shunted to ground by the terminating resistor unit 15 connected to the other output terminal of the circulator unit. Thereby, back flow of RF output to the monitor unit 13 is blocked.

That is, in the directional coupler 132 in the RF output monitor unit 13, to take out RF coupled output from the side opposite to that in the conventional one, the length L of the coupling line 1321 is set such that $L<\lambda/4$. This causes the directivity of the coupling to be lowered. RF power obtained from the RF coupled output is converted into a DC voltage in the RF detection circuit 133 to monitor the RF power. On the other hand, RF power returned from the output side is blocked by the circulator unit 14 functioning as an isolator. The performance of the output monitor circuit which is comparable to that of the conventional one can be achieved and erroneous detection can be prevented.

According to the output monitor circuit thus configured, therefore, the RF output monitor unit 13 can be made small in size by orienting the RF output end of the directional coupler toward the RF output side and making the length of the coupling line less than $\lambda/4$. In addition, it is not necessary to fold back of line pattern. Therefore, this also makes it possible to set the width of each of the base plates for the amplifier unit 12 and the monitor unit 13 to W as shown in FIG. 1. Moreover, RF output monitoring accuracy and device performance can be improved because back flow of unwanted signal components due to signal reflection, wrap-around, and so on is almost completely suppressed. The improved monitoring accuracy allows failure detection utilizing monitor outputs, temperature compensation, and feedback control based on level detection to be implemented with higher accuracy.

The above embodiment is configured such that the circulator unit 14 is set on the output side of the monitor unit 13 in order to prevent back flow of unwanted signal components to the RF detection circuit. In microwave circuits used in radar equipment and so on, a circulator (or an isolator) is generally set on the output side of an amplifier. In this case, it is also possible to use that circulator as the circulator unit 13 described above.

Although, in the embodiment described above, each of the circuit components is unitized, they may be integrated in whole or in part.

Although the embodiment has been described as monitoring the output state of a microwave amplifier, the subject to be monitored in this invention is not limited to the microwave amplifier and the principles of the invention are applicable to any other radio-frequency circuit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An output monitor circuit of a radio-frequency circuit which monitors a radio-frequency (RF) signal of wavelength $\lambda$ that is output from a radio-frequency circuit, comprising:
    an output line formed on a substrate, wherein the output line inputs the radio frequency signal from an RF input end, and transmits the radio frequency signal to an RF output end;
    a coupling line of a length less than $\lambda/4$ formed on the substrate and that faces and couples with the output line;
    a terminating resistor placed on the substrate and connecting one end of the coupling line that is located on a side of the RF input end of the output line and a grounding line on the substrate;
    a detection circuit placed on the substrate and which detects a radio-frequency signal derived from the coupling line, to produce a monitor signal; and
    a back flow blocking circuit which blocks signal components back flowing from the RF output side toward the output line in a portion where there is no coupling between the output line and the coupling line.

2. The output monitor circuit according to claim 1, wherein the radio-frequency circuit is a radio-frequency amplifier.

3. The output monitor circuit according to claim 1, wherein the back flow blocking circuit is a circulator which conducts a radio-frequency signal derived from the radio-frequency circuit to the output line to the RF output end and conducts signal components flowing from the RF output end into the circulator to ground line.

* * * * *